United States Patent [19]
Olson et al.

[11] Patent Number: 6,007,098
[45] Date of Patent: Dec. 28, 1999

[54] LOW COST PYROTECHNIC INFLATOR

[75] Inventors: Brent K. Olson, Clearfield; Brian M. Shaklik, Fruit Heights, both of Utah

[73] Assignee: Autoliv ASP, Inc., Ogden, Utah

[21] Appl. No.: 09/025,887

[22] Filed: Feb. 18, 1998

[51] Int. Cl.[6] ................................................ B60R 21/26
[52] U.S. Cl. ........................ 280/741; 280/236; 280/742
[58] Field of Search .................................. 280/741, 736, 280/742, 740; 102/530, 531; 422/164

[56] References Cited

U.S. PATENT DOCUMENTS

| | | |
|---|---|---|
| 3,715,131 | 2/1973 | Hurley et al. . |
| 3,904,221 | 9/1975 | Shiki et al. . |
| 4,249,673 | 2/1981 | Katoh et al. . |
| 4,316,874 | 2/1982 | Kasama et al. ........................ 422/126 |
| 4,530,516 | 7/1985 | Adams et al. . |
| 4,547,342 | 10/1985 | Adams et al. . |
| 4,943,086 | 7/1990 | Cunningham . |
| 5,048,862 | 9/1991 | Bender et al. . |
| 5,115,080 | 5/1992 | Waggoner et al. . |
| 5,189,255 | 2/1993 | Fukabori et al. . |
| 5,201,542 | 4/1993 | Thuen et al. ............................ 280/736 |
| 5,350,193 | 9/1994 | Murashima et al. . |
| 5,419,875 | 5/1995 | Decker et al. . |
| 5,439,250 | 8/1995 | Kokeguchi et al. . |
| 5,503,806 | 4/1996 | Fulmer et al. . |
| 5,527,067 | 6/1996 | Iwai et al. . |
| 5,738,373 | 4/1998 | Siddiqui ................................. 280/740 |
| 5,763,821 | 6/1998 | Wheatley ............................... 149/19.5 |
| 5,778,509 | 7/1998 | Hamilton et al. ......................... 29/428 |
| 5,834,679 | 11/1998 | Seeger .................................... 102/288 |
| 5,851,028 | 12/1998 | Thibodeau .............................. 280/736 |

*Primary Examiner*—Christopher P. Ellis
*Attorney, Agent, or Firm*—Ohlandt, Greeley, Ruggiero & Perle, LLP; George W. Rauchfuss, Jr.

[57] ABSTRACT

A simplified airbag inflator providing a convoluted pathway for passage of inflation gases from the combustion chamber of the inflator to exhaust ports leading to an inflatable airbag is provided. The inflator has a U-shaped filter element and U-shaped diffuser attached to an inflator housing defining the combustion chamber. The combustion chamber is closed off with an end plate having generally axially aligned exit holes therein. Inflation gases would flow axially from the combustion chamber through the exit holes in the end plate, radially then axially through the filter element, and then radially out exhaust ports in the diffuser.

9 Claims, 2 Drawing Sheets

LOW COST PYROTECHNIC INFLATOR

BACKGROUND OF THE INVENTION

The present invention relates to inflators or gas generators that utilize the combustion of a solid fuel as a gas generant means for the purpose of rapidly inflating vehicle crash protection bags, commonly called airbags.

A variety of forms of gas generators or inflators for the above-noted airbags have been disclosed in a number of pieces of prior art. For example, one such inflator is disclosed in U.S. Pat. No. 4,547,342 to Adams, et al, which is assigned to the assignee of the present application and which is incorporated herein by reference. Another patent, U.S. Pat. No. 4,943,086, cites the Adams, et al, patent and describes in some detail the process of manufacturing that particular airbag.

Another patent of interest with reference to the present application is U.S. Pat. No. 5,048,862 which discloses a gas generator for an airbag for crash protection in a vehicle and which includes a chamber provided around a cylindrical pressure reservoir filled with gas releasing materials.

While the devices of each of the above cited patents may have its own particular benefits or advantages, in keeping with the greater current emphasis on more simplified construction, the present invention seeks to minimize the number of parts involved in the construction of an airbag gas generator.

It is therefore an object of the present invention to significantly reduce the number of parts in the design of a inflator or gas generator for an airbag or the like.

Another object is to simplify the assembly of the parts of the inflator by providing the filter means in the form of a screen pack having a wire mesh design requiring no in-house assembly.

Another object is to provide an inflator wherein the securing of the parts of the inflator with each other and with the airbag may be accomplished most efficiently.

A specific object is to provide an improvement in the absorption of heat from the generating gas before it enters the airbag. A further specific object is to increase filtering action required by efficiently removing solid particulate material from the gas.

Yet another object is to provide a convoluted pathway for generated gas flow including a complete reversal of direction, but to extend that pathway, and to do so by a simplified construction when compared with the prior art.

SUMMARY OF THE INVENTION

The above-noted objects and advantages are fulfilled by the primary features of the present invention. A first feature resides in the provision of axially extending holes or apertures in a closure plate for the combustion chamber of the inflator, and having the filter means extend over the closure plate at the one end of the housing so as to be adjacent to the axially extending combustion exit holes formed in the plate. This arrangement contributes to the desired improvement in absorption of heat from the generated gas, as well as enabling better removal of chaff or solid particulate residue from the gas. Further, this arrangement includes a convoluted pathway which terminates at radially extending gas exhaust ports in the diffuser element.

A second feature of the invention resides in the provision of a simple means for securing the diffuser element of the inflator to the cylindrical housing, preferably by means of confronting flanges rather than welding. Welding is employed in the construction of the device of the present invention but is limited to one joint, i.e., the joint by which the plate is secured to the rim end of the cylindrical housing.

Accordingly, the present invention in its broad, principal aspect may be defined as follows: an airbag inflator arrangement with a cylindrical housing defining a combustion chamber, the housing including a closed end and an open end, the open end defining a peripheral rim, an end plate for closing said open end, and means for securing the plate at the rim of said open end. There is inflator gas generating material within the combustion chamber, with an ignition device supported at the closed end and extending into the combustion chamber for igniting the gas generating material. Moreover, a U-shaped filter element abuts both the end plate and a substantial part of the sidewall of the cylindrical housing, and a U-shaped diffuser has radially extended gas exhaust ports to an airbag, and the diffuser surrounds and abuts the filter. In addition, inflation gas exit holes extend generally axially from the combustion chamber through the end plate to the filter.

The above definition of the principal aspect of the invention includes several of the features already discussed. The present invention also provides, in a more specific aspect, the already noted feature of the convoluted pathway for the generated inflation gas flow to from the combustion chamber of the inflator to the exhaust ports in the diffuser sidewall. In another specific aspect, the invention resides in a provision for avoiding the need of welding the diffuser of the inflator to the combustion housing. Instead, the diffuser and the abutting screen pack are brought together and are slid together over the housing and then attached with the housing to an airbag module.

Other and further objects, advantages and features of the present invention will be understood by reference to the following specification in conjunction with the annexed drawings, wherein like parts have been given like numbers.

DESCRIPTION OF PREFERRED EMBODIMENT

Figures 1, 2:
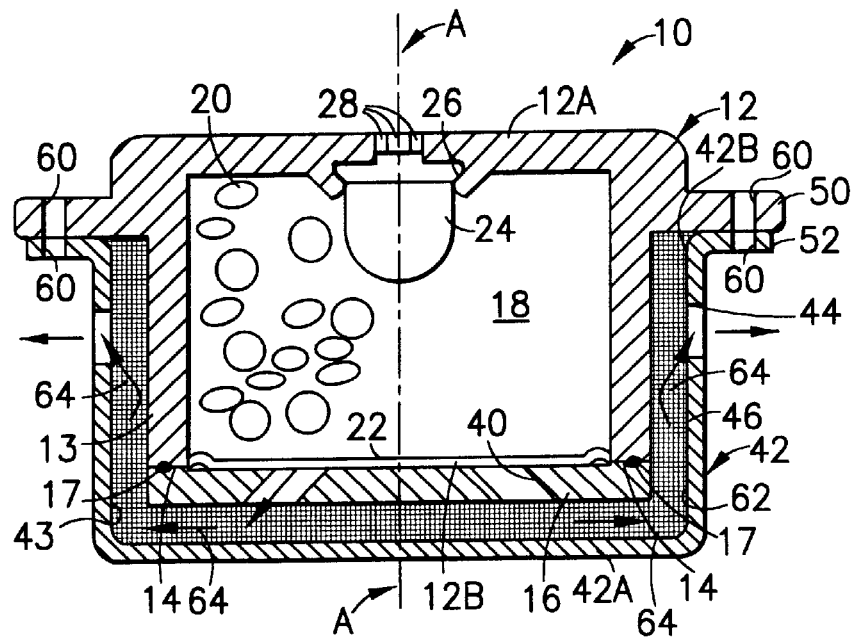
FIG. 1 is a vertical section taken on the line 1—1 of FIG. 3, but shown in inverted position from that of FIG. 3.
FIG. 2 is an exploded view showing the several parts, inverted from the showing in FIG. 1, and showing how the parts are secured together.
Figure 3:
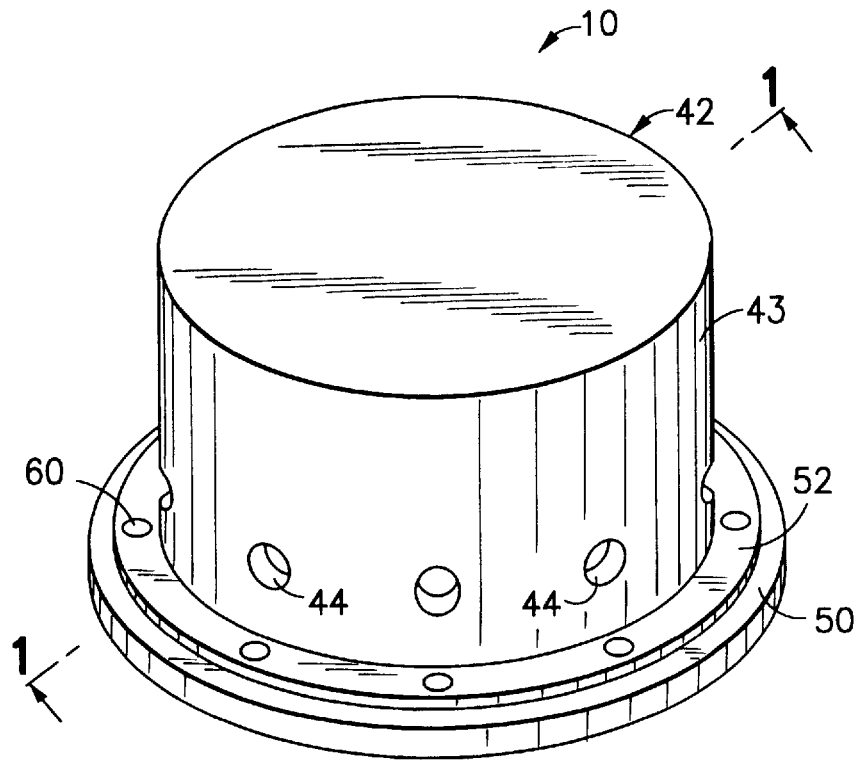
FIG. 3 is a perspective view showing the airbag inflator fully assembled except that the airbag and airbag module itself has not been affixed to the inflator or generator.
Figure 4:
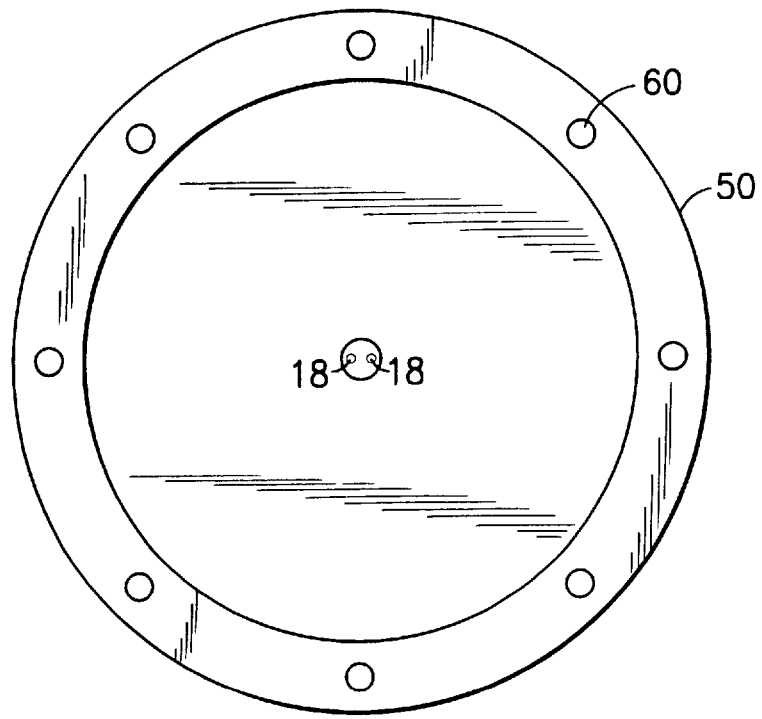
FIG. 4 is a bottom plan view of the inflator illustrating the way in which the igniter is electrically connected so as to be placed in its operative state.

Referring to the drawings, there is shown generally at 10 an inflator or gas generator which may be used to provide inflation gases for rapidly inflating a vehicle crash protection bag—commonly known as airbag. The inflator 10 has a generally cylindrical external outline and includes a generally cup-shaped cylindrical housing 12 with a closed first end 12A extending by a circular sidewall 13 to an open opposite end 12B defining a peripheral rim 14. An end plate 16 is used to close the open end 12B of the cylindrical housing. Such end plate 16 can be secured to rim 14 by any suitable means such as by welding. As a consequence, a thoroughly secure combustion chamber 18 is realized along axis A for the appropriate combustion of gas generating materials 20, preferably in the form of gas generating pellets. The uniformly distributed pellets 20 seen within combustion chamber 18 involve a gas generating composition which may be any one of a number of substances which can fulfill the requirements of proper burning rate, non-toxicity and flame temperature. It will be understood, of course, that suitable forms other than pellets, for example, wafers or the like can just as well be employed.

In order to hold the gas generating material 20 within the cylindrical housing 12, as the inflator is being assembled, a retaining disk 22 may be utilized at open end 12B. However, the welded joint 17 of the end plate 16 with the rim 14 of cylindrical housing 12 can be accomplished while the housing is in an inverted position from that seen in FIG. 1, thereby dispensing with the need for the retaining disk.

In any event, the gas generating composition 20 is ignited by means of a squib or igniter 24 which, as seen, extends into the combustion chamber 18 and is held in place within a recess 26 formed at the interior surface of the closed end wall 12A of the cylindrical housing 12. A suitable electrical connection 28 (FIG. 5) is made to squib or igniter 24 for the purpose of conducting current to the squid or igniter 24 at the appropriate time responsive to a sudden change in acceleration.

It is especially to be noted that a series of generally axially aligned exit holes or apertures 40 is provided through the end plate 16 at the closed end 12B of cylindrical housing 12. It will thus be appreciated that the gases generated in the combustion chamber 18 will be expelled in a generally axial direction away from the igniter 24. This arrangement of the generally axially extending combustion exit apertures 40 results in an improvement in the absorption of heat from the generated combustion gases. Such improvement follows from the fact that, coupled with above noted placement of the combustion gas exit apertures 40, the construction outside of the cylindrical housing 12 has been specially designed. Instead of simply having a diffuser with its series of gas exit apertures extending axially through the diffuser directly to an inflatable airbag, the diffuser 42 of this invention is of a generally U- or cup-shaped configuration. The U-shaped diffuser 42 has a closed end 42A and an open end 42B at opposite ends of a circular sidewall 43. A plurality of radially extending gas exhaust ports 44 are provided in diffuser sidewall 43 adjacent opened end 42A.

A complimentary U- or cup-shaped filter element 46, generally in the form of a concentric screen back or mesh, is provided and mates with the inner surface 45 of diffuser 42.

It will now be understood that no special in-house assembly is required in the fabrication of the inflator of the present invention. This is because the filter element 46 is a preformed wire mesh screen pack design and this screen pack, as just alluded to, is simply fitted into the interior of the diffuser 42 and the combination of the two components can then be slidably positioned over cylindrical housing 12. By this construction, the U-shaped filter element 46 extends over substantially the entire outer length of the sidewall 13 of cylindrical housing 122 and also extends over the entire end plate 16 that is remote from the squib or igniter 24 in the closed end 12A of the housing 12.

Another provision of this invention is that radial confronting flanges are provided, one being formed on cylindrical housing 12 at the periphery of closed end 12A and designated 50, and the other radial flange, designated 52, being formed on the diffuser 42. A plurality of aligned holes 60 is provided in each of the radial flanges 50 and 52 such that suitable bolts may be run through the holes 60 whereby the housing and diffuser may be affixed together to an airbag module (not shown).

Operation of the inflator 10 begins with an electrical signal from a crash sensor (not shown) to the igniter 24, which fires into a combustion chamber 18, thereby igniting the pellets 20, resulting in generation of hot inflation gases. These inflator gases produced by the ignition of the pellets flow away from the igniter axial through exit apertures 40 in the end plate 16, and thence through the screen pack 46 along end plate 16 until the gases reach diffuser sidewall 45 where they are then directed axially along the diffuser sidewall through the screen pack until they reach radial exhaust ports 44 where the gases again change direction and are radially expelled through ports 44 to an inflatable airbag (not shown), this flow path being indicated by arrows 64. Because of the extended, convoluted flow path 64 encountered, the inflation gases are substantially cooled. Also, due to the mesh nature of screen pack 46, which fills the chamber 62 between housing 12 and diffuser 42, filtering takes place and chaff or particulate matter is advantageously removed from the inflation gases as they traverse the flow paths after which they proceed to an airbag through the radially extending apertures 44 in the diffuser sidewall 45.

The invention having been thus described with particular reference to the preferred forms thereof, it will be obvious that various changes and modifications may be made therein without departing from the spirit and scope of the invention as defined in the appended claims.

We claim:

1. An airbag inflator comprising:
   a cylindrical housing defining a combustion chamber, said housing including a closed end and extending by a circular housing sidewall to an open end defining a peripheral rim, an end plate closing said open end of the housing, and means securing the plate at the peripheral rim of said open end;
   inflation gas generating material within the combustion chamber, and an ignition device supported at the closed end and extending into the combustion chamber for igniting the gas generating material;
   a U-shaped filter means for filtering inflation gases abutting both the plate and a substantial part of circular sidewall of the housing;
   a U-shaped diffuser having radially extending gas exhaust ports, said diffuser surrounding and abutting the filter means whereby the gas exhaust ports are proximate the closed end of the cylindrical housing; and
   gas exit holes extending generally axially from the combustion chamber through the end plate to the filter means.

2. A device as defined in claim 1, in which said means securing the end plate to the open end of the cylindrical housing comprises a welded joint at the peripheral rim of the housing.

3. A device as defined in claim 2, further comprising a disk for retaining the inflation gas generating material within the cylindrical housing.

4. A device as defined in claim 1, in which said filter means includes a screen pack having a preformed wire mesh design.

5. A device as defined in claim 1, further including confronting flanges on each of the cylindrical housing and the diffuser for holding the diffuser in place against the housing.

6. An airbag inflator comprising a cylindrical housing defining a substantially cylindrical combustion chamber along an axis; said combustion chamber housing a gas generating material; and igniter in a first end wall of the cylindrical housing and extending into the gas generating material in the combustion chamber for igniting the gas generating material; an end plate attached to a cylindrical sidewall of the cylindrical housing and forming a second end wall of the cylindrical housing opposite the first end wall; a filter element means for filtering inflation gases being arranged around the end plate and the cylindrical sidewall of the housing in a chamber between the cylindrical housing and a generally U-shaped diffuser surrounding the end plate and the sidewall of the cylindrical housing; the end plate having a plurality of generally axially extending gas exit apertures for permitting passage of gases from the combustion chamber through the end plate and into the filter element along the end plate at a position remote from the first end in which the igniter is located; and the U-shaped diffuser having a plurality of radial gas exhaust ports therein in a position proximate the first end wall in which the igniter is located such that inflation gases produced in the combustion chamber first flow axially through the exit aperatures of the end plate, then radially through the filter element, then axially through the filter element along the cylindrical sidewall of the housing and then radially out through the radial exhaust ports in the diffuser.

7. An airbag inflator according to claim 6 wherein a flange extends radially from the closed end of the cylindrical housing, a flange extends radially from an open end of the U-shaped diffuser, the two radially extending flanges overlaying each other and having aligned holes therethrough for permitting attachment of the cylindrical housing and the diffuser to an airbag module.

8. An airbag inflator according to claim 7 wherein a weld attaches the end plate to a rim of the cylindrical sidewall of the cylindrical housing.

9. An airbag inflator according to claim 8 wherein the filter element comprises a U-shaped preformed screen pack of wire mesh.

* * * * *